Oct. 17, 1933.  V. J. CHAPMAN ET AL  1,931,129

ARC WELDING

Original Filed June 30, 1930

Inventors:
Verni J. Chapman,
Robert M. Stephens,
by Charles E. Tulla
Their Attorney.

Patented Oct. 17, 1933

1,931,129

UNITED STATES PATENT OFFICE 1,931,129

ARC WELDING

Verni J. Chapman and Robert M. Stephens, Schenectady, N. Y., assignors to General Electric Company, a corporation of New York Application June 30, 1930, Serial No. 464,722
Renewed March 10, 1933

8 Claims. (Cl. 219—8)

Our invention relates to electric arc welding, and more particularly to electric arc welding of the automatic or semi-automatic type wherein the welding arc is maintained between an electrode and the work, and wherein means are provided for feeding the electrode into and out of engagement with the work to strike the arc and thereafter regulating the rate of feed toward the work to maintain the arc at substantially constant length.

An object of our invention is to provide an improved system which is simple, rugged and sensitive.

A further object of our invention is to provide an improved system in which voltages higher than the drop across the arc may be utilized for operating the feed motor.

A further object of our invention is to provide a system in which the electrical control is so organized that different sizes of welding electrodes and different welding currents may be employed without readjusting the control circuits.

Our invention will be better understood from the following description taken in connection with the accompanying drawing, and its scope will be pointed out in the appended claims.

Figure 1:
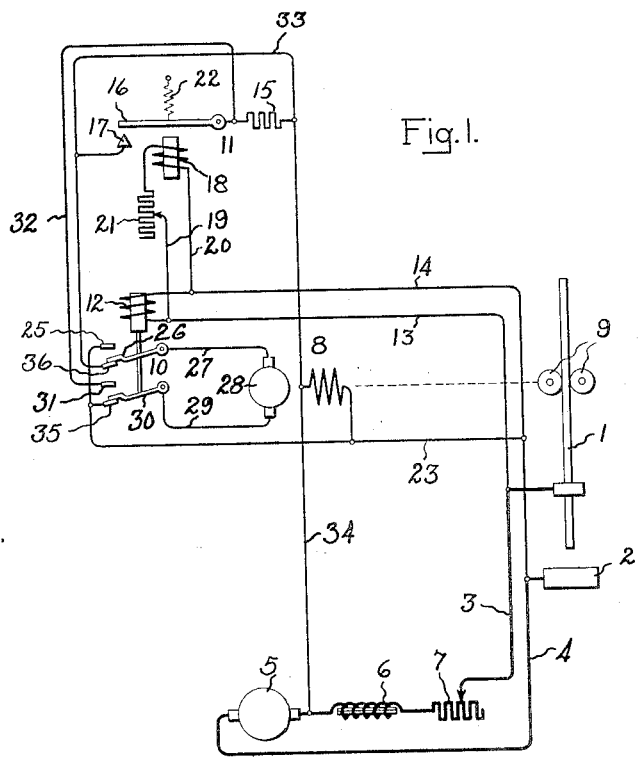
Figure 2:
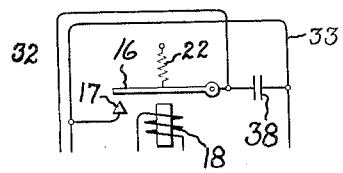

In the drawing Fig. 1 diagrammatically represents a welding system according to our invention, and Fig. 2 shows the regulator of Fig. 1 in which a different feed motor controlling means has been employed than in Fig. 1.

According to our invention the electrode feeding means is operated by a motor connected to a substantially constant voltage supply circuit through a reversing switch and a regulator which are connected to be responsive to the electrical condition of the arc and control the feeding of the electrode by controlling the speed and direction of rotation of the feed motor.

In Fig. 1 the welding electrodes are shown at 1 and 2. These electrodes are connected through welding circuit 3, 4 to a constant voltage welding generator 5. The characteristic of the constant voltage generator 5 is suitably modified as by means of reactance 6 and resistance 7 to obtain the current characteristic desired for welding purposes.

The welding current may be supplied by special generators in which case it will be necessary to provide a separate source of constant potential current for operating the feed motor as will become apparent from the following description of our invention. However, if a generator of the type described and claimed in Bergman Patent No. 1,340,004, granted May 11, 1920, be employed a source of constant voltage may be obtained from the same generator that is used to supply the welding current.

In the particular arrangement shown the electrode 1 is fed to the electrode 2, which may constitute the work parts to be welded, by means of a feed motor 8 connected through suitable speed reducing gearing (not shown) to feed rolls 9 adapted to engage the electrode 1. The feed motor 8 is preferably a shunt wound motor and is connected to a substantially constant voltage supply circuit generator 5 of the illustrated system, and is controlled by a reversing switch 10 and a regulator 11 connected in circuit therewith. The reversing switch is of the double pole double throw type and is controlled by a coil 12 connected across the welding electrodes 1, 2 through conductors 13, 14. The regulator 11 is of the vibrating type having a motor controlling means 15, shown in Fig. 1 as a resistance, which may be shorted out of circuit through connections including contacts 16, 17 depending upon the excitation of its controlling coil 18. This coil is connected across the welding electrodes 1, 2 through connections 14, 20 and 13, 19 and its energization is controlled by means of an adjustable resistance 21 connected in series therewith.

The control circuits will be traced in greater detail in connection with the operation of the system, which will now be described.

In Fig. 1 the reversing switch 10 and regulator 11 are shown in the positions assumed by them when the system is deenergized and the electrodes 1 and 2 are out of engagement with one another. When the welding circuit is energized by connecting the generator 5 thereto through a switch not shown in the diagrammatic illustration of Fig. 1, coils 12 and 18 of switch 10 and regulator 11 are energized. Switch 10 then moves to its upper position and contacts 16 and 17 of the regulator 11 are then brought into engagement with one another against the action of spring 22 which acts to separate the same. The circuit through coil 12 is completed as follows: From the plus terminal of generator 5 through conductors 4 and 14 to coil 12 and thence by conductors 13 and 3, adjustable resistance 7 and reactance 6 to the negative terminal of the generator. The circuit through coil 18 is completed as follows:—From the plus terminal of generator 5 through conductors 4, 14 and 20 to coil 18 and thence through regulating resistance 21 and conductors 19, 13 and 3, adjustable resistance 7, and inductance 6 to the negative pole of the generator 5. With coils 12 and 18 thus energized the feed motor armature is connected across the generator 5 through the following circuit: From the plus terminal of generator 5 through conductors 4, 14 and 23, switch contact 25, switch member 26, conductor 27, armature 28 of feed motor 8, conductor 29, switch member 30, switch contact 31, conductor 32, contacts 16 and 17 of regulator 11 and conductors 33 and 34 to the negative terminal of generator 5. The field of the feed motor 8 is connected across the generator 5 through conductors 4, 23, and 34. It will be noted that this circuit is not subject to control, and that the field of motor 8 is at all times fully excited by reason of its connections to generator 5. With the circuits completed as just described, the motor 8 is connected to the generator 5 in such manner that it operates at constant speed to feed the electrode 1 toward the electrode 2.

This feeding operation will continue until electrode 1 comes into engagement with electrode 2. When this occurs the electrodes 1 and 2 short circuit the operating coils 12 and 18 of the reversing switch 10 and regulator 11, thereby deenergizing the same, and allowing them to assume the positions illustrated in the drawing. The circuit through these devices is then as follows:—From the plus terminal of generator 5 through conductors 4 and 23, switch contact 35, switch member 30, conductor 29, armature 28 of feed motor 8, conductor 27, switch member 26, switch contact 36 and conductors 33 and 34 to the negative terminal of generator 5. With the connections thus established it will be noted that the flow of current through the armature 28 of feed motor 8 is in the reverse direction from that previously established when the electrodes were out of engagement with one another, and that the armature is connected directly across the welding generator 5 as was previously the case. With the connections thus established feed motor 8 will reverse its direction of rotation and withdraw electrode 1 from electrode 2 thereby establishing a welding arc between these electrodes.

When the voltage drop across the arc has attained a predetermined value, coils 12 and 18 of the reversing switch 10 and regulator 11 will be sufficiently energized to bring these devices once more into operation. Coil 12 will move switch members 26 and 30 to their upper position thereby completing a circuit across the welding generator 5 as follows:—From the plus terminal of generator 5 through conductors 4, 14 and 23, switch contact 25, switch member 26, conductor 27, armature 28 of feed motor 8, conductor 29, switch member 30, switch contact 31, conductor 32, resistance 15, or contacts 16 and 17 and conductor 33 to conductor 34 and thence to the negative terminal of generator 5. Whether the circuit of the feed motor armature 28 will be completed through resistance 15 or the contacts 16 and 17 of the regulator will depend upon the adjustment of the spring 22 and the regulating resistance 21, inserted in series with coil 18 of regulator 11.

With the circuits completed as just described, the feed motor 8 will again function to feed the electrode 1 toward the work 2. The rate of feeding will depend upon the control exerted on the feed motor by the regulator 11 which in turn will depend upon the voltage conditions of the arc. If the voltage becomes too great due to the electrode being fed too slowly, contacts 16 and 17 will be closed and the full voltage of the generator 5 will be applied to the feed motor 8 which will accordingly increase its speed. This will cause the electrode 1 to be fed toward the work at a greater speed and when the desired arc length has again been obtained the voltage across the electrodes will fall to such a value that spring 22 of the regulator will separate contacts 16 and 17, thereby inserting resistance 15 in series with the feed motor 8. This will reduce the voltage applied to the feed motor and consequently reduce its speed which, in turn, will result in a decreased rate of feeding of electrode 1 toward electrode 2. It will thus be seen that by rapidly making and breaking the circuit shunting the controlling means of the regulator that the speed of the feed motor will be controlled in such manner as to secure that rate of electrode feed desired to maintain an arc of any given length or voltage.

By adjusting the tension of spring 22 and the amount of resistance 21 inserted in series with the regulating coil 18 any desired arc voltage may be determined. It will be noted, however, that at all times during the operation of striking and maintaining the arc that the feed motor armature 28 is connected directly across the terminals of generator 5, and that at all times full field is maintained on the feed motor 8 through connections that are not interrupted at any time during the controlling operation. The feed motor thus operates under full field conditions and with full voltage applied to its armature during the operation of feeding the electrode to and from the work in order to strike the arc, and during welding, with full voltage applied to its field and a modified voltage applied to its armature to control its speed of operation. The modified voltage is determined by the regulator 11 which functions to insert in series with the motor armature a controlling means such as the resistance 15 illustrated in Fig. 1.

In our system the feed motor may be connected to a source of supply of substantial voltage. In the particular system illustrated the voltage of generator 5 would be about 60 volts. By reason of this the feed motor may have a high resistance armature circuit and embody the usual features of design. All difficulties encountered in low voltage motors due to brush drop are thus eliminated. Furthermore in our system any change in the welding current or in the size of electrode employed will not necessitate a change in the electrical adjustment of the system. When such a change is made it will be desirable in order to save duty on the regulator contacts, but not necessary, to change the gear reduction between feed motors 8 and feed rolls 9. This is a mechanical operation quickly and easily accomplished by any workman not familiar with electrical circuits. The operation of the regulator 11 will under all conditions take care of speed variations in electrode feed necessary to accommodate variations in the rate of fusing of the electrode 1 during the welding operation.

The controlling means 15 shown in Fig. 1 may be entirely omitted, which is equivalent to using an infinite resistance, other controlling means such as the capacity 38 shown in Fig. 2 may be employed for controlling the speed of the feed motor. It is of course apparent that in place of a capacity 38 an impedance may be used or a resistance, capacity and impedance separately, or in combination may be employed. Other means for controlling the motor may be substituted in place of the resistance 15 or the capacity 38. It is likewise apparent that instead of controlling the armature of the feed motor 8, the field circuit of this motor may be controlled in the same manner to accomplish the same result as that obtained by controlling its armature circuit.

While we have shown and described a preferred embodiment of our invention, it will be apparent to those skilled in the art that other modifications than those above noted are possible, and we therefore aim in the appended claims to cover all such modifications and variations as fall within the true spirit and scope of our invention.

What we claim as new and desire to secure by Letters Patent of the United States, is:

1. An arc welding system wherein means are provided for moving cooperating welding electrodes into and out of contact with one another, comprising electrode feeding means, means including a motor for operating said feeding means, a substantially constant voltage supply circuit, means including a reversing switch and a vibratory regulator for connecting said motor to said constant voltage supply circuit, and means connected to be responsive to the electrical condition of the arc for operating said regulator and said reversing switch to control the speed and direction of rotation of said motor.

2. An arc welding system wherein means are provided for moving cooperating welding electrodes into and out of contact with one another comprising electrode feeding means, means including a motor for operating said feeding means, a reversing switch for said motor, a vibratory regulator connected to be responsive to arc voltage for controlling the speed of said motor, a substantially constant voltage supply circuit, means including said reversing switch and said vibratory regulator for connecting said motor to said constant voltage supply circuit, and means responsive to arc voltage for operating said reversing switch.

3. An arc welding system wherein means are provided for moving cooperating welding electrodes into and out of contact with one another comprising electrode feeding means, means including a motor having field and armature circuits for operating said feeding means, a reversing switch for said motor, a vibratory regulator connected to be responsive to arc voltage for controlling the speed of said motor, a substantially constant voltage supply circuit, means including said reversing switch and said vibratory regulator for connecting one of said motor circuits to said constant voltage supply circuit, means for connecting the other of said motor circuits to said constant voltage supply circuit, and means responsive to arc voltage for operating said reversing switch.

4. An arc welding system wherein means are provided for moving cooperating welding electrodes into and out of contact with one another comprising electrode feeding means, means including a motor having armature and shunt field circuits, for operating said feeding means, a substantially constant voltage supply circuit, means including a reversing switch and a vibratory regulator for connecting one of said motor circuits to said constant voltage supply circuit, means for connecting the other of said circuits to said constant voltage supply circuit, and means responsive to an electrical condition of the arc for operating said regulator and said reversing switch to control the speed and direction of rotation of said motor.

5. An arc welding system wherein means are provided for moving cooperating welding electrodes into and out of contact with one another comprising electrode feeding means, means including a shunt motor for operating said feeding means, a reversing switch for said motor, a vibratory regulator connected to be responsive to arc voltage for controlling the speed of said motor, a substantially constant voltage supply circuit, means including said reversing switch and said vibratory regulator for connecting the armature of said motor to said constant voltage supply circuit, means for connecting the field of said motor to said constant voltage supply circuit and means responsive to arc voltage for operating said reversing switch.

6. An arc welding system wherein means are provided for moving cooperating welding electrodes into and out of contact with one another comprising electrode feeding means, means including a motor for operating said feeding means, a vibratory regulator having motor controlling means and contacts for rapidly making and breaking a circuit shunting said motor controlling means, a substantially constant voltage supply circuit, means including a reversing switch and the motor controlling means of said vibratory regulator for connecting said motor to said constant voltage supply circuit, and means responsive to arc voltage for operating said reversing switch and said regulator to control the direction and speed of rotation of said motor.

7. An arc welding system wherein means are provided for moving cooperating welding electrodes into and out of contact with one another comprising electrode feeding means, means including a motor for operating said feeding means, a vibratory regulator connected to be responsive to arc voltage and having a resistance and contacts normally biased out of engagement with one another for rapidly making and breaking a circuit short circuiting said resistance for controlling the speed of said motor, a substantially constant voltage supply circuit, means including a reversing switch and the resistance element of said vibratory regulator for connecting said motor to said constant voltage supply circuit, and means responsive to arc voltage for operating said reversing switch.

8. An arc welding system comprising electrode feeding means, means including a motor for operating said feeding means, a reversing switch for said motor, a vibratory regulator having motor controlling means and contacts biased out of engagement with one another for rapidly making and breaking a circuit shorting said motor controlling means, a substantially constant voltage supply circuit, means including said reversing switch and the motor controlling means of said vibratory regulator for connecting said motor to said constant voltage supply circuit, means for biasing said reversing switch to a position in which the feeding motor is connected to the constant voltage supply circuit for rotation in a direction to withdraw one electrode from the other, and means responsive to arc voltage for operating said regulator and said reversing switch to control the speed and direction of rotation of said motor.

VERNI J. CHAPMAN.
ROBERT M. STEPHENS.